Patented July 29, 1947

2,424,851

UNITED STATES PATENT OFFICE 2,424,851

POLYMERIC PEROXIDES OF ACETONYL ACETONE

Hyman Rudoff, Santa Fe, N. Mex., assignor to Pittsburgh Plate Glass Company, Allegheny County, Pa., a corporation of Pennsylvania No Drawing. Application October 7, 1944, Serial No. 557,731

2 Claims. (Cl. 260—338)

This application relates to new organic compounds containing oxygen in readily available form. The new compounds may be regarded as peroxides of acetonylacetone which have a variable amount of peroxy oxygen depending upon the method of preparation and the extent of reaction.

One purpose of this invention is to provide a new catalyst for conducting ethylenic reactions at temperatures between 80 and 125° C. A further purpose is to provide a means of polymerizing ethylenic compounds, such as vinyl acetate, styrene, diallyl phthalate, and vinyl chloride, in the presence of air without the usual surface inhibition of the polymerization.

Ketone peroxides, and particularly acetone peroxide, are well known as polymerization catalysts. They are, however, very stable and usually require temperatures in excess of 125° C. in order to render them suitable for the polymerization of ethylenic compounds. The ketone peroxides are usually only moderately effective in the presence of air which prevents complete polymerization on the exposed surface.

I have prepared new peroxy compounds, derived from acetonylacetone, which catalyze the polymerization of ethylenic compounds at temperatures substantially below those effective for polymerization when catalyzed with ketone peroxides and which are not inhibited by the presence of air. Accordingly, a new polymerization process is made available for a specific use in a specialized field.

My new compounds have the empirical formula $(C_6H_{10}O_x)_n$ in which $x$ will vary from three to four, and $n$ is a whole number. The structural formula of this group of compounds is not definitely known, but, in its monomeric form, it is believed to have the following structure:

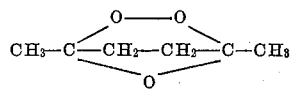

when it is partially peroxidized, and

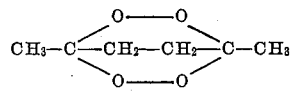

when it is completely peroxidized.

My new peroxide compounds exist in polymeric form. The structural formula:

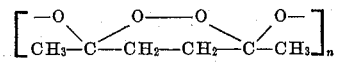

may be drawn for the polymer of the completely peroxidized modification and the structure

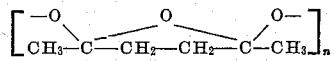

for the partially peroxidized modification. It is quite apparent that polymers may exist in which some of the molecular increments are incompletely peroxidized and other molecular increments are completely peroxidized. Hence, in the empirical formula $(C_6H_{10}O_x)_n$ the $x$ may vary from three to four depending upon the proportion of each type of peroxy compound.

My new compounds are prepared by reacting acetonylacetone with hydrogen peroxide in the presence of an acid, such as concentrated hydrochloric acid, while cooling to prevent a substantial increase in temperature. The reaction is generally conducted by gradually adding an aqueous hydrogen peroxide solution to the acetonylacetone and stirring the reaction mass vigorously while in contact with a suitable cooling medium to dissipate the heat of reaction. Generally, a viscous non-aqueous phase separates during the reaction. This viscous liquid appears to be a mixture of both monomer and polymer of varying degrees of peroxidation. By suitable precautions it is possible to obtain a mixture comprised of substantially entirely the completely peroxidized monomer and polymer. Similarly, control of the reaction may be such as to provide a mixture of monomer and polymer of the partially peroxidized compound. The viscous mixtures of monomer and polymer may be treated to separate a solid peroxy compound by adding to the mixture a substantial volume, for example an equal volume of methyl alcohol, or other non-solvent for the polymer, which dissolves the monomer and other organic compounds present and causes the higher polymers to precipitate as solids.

The new solid polymeric peroxy compounds are quite stable at normal temperatures, but are sensitive to percussion and to temperatures in excess of 150° C. They will also explode when contacted with concentrated sulphuric acid. The polymers will have melting points varying from 100 to 160° C. depending upon the extent of polymerization.

The peroxides of acetonylacetone are useful as catalysts in the polymerization of ethylenic compounds, as bleaching agents, or in many other ways in which organic peroxy compounds are generally useful. Further details of the preparation and use of the new compounds will be described with respect to specific examples:

Example I

Aqueous hydrogen peroxide (48 g. of a 28.5 percent solution) was added to 22.8 g. of acetonylacetone while maintaining the temperature below 10° C. The addition was made over a period of 30 minutes while constantly stirring the reaction mass. A 24 cc. portion of concentrated hydrochloric acid was then added while continuing the stirring. The reaction mass was kept cooled for one hour, after which it was stirred for 16 hours without cooling, the temperature slowly rising to room temperature. The two liquid phases were separated and the nonaqueous phase dispersed in 75 cc. of methanol. This caused a precipitation of polymeric peroxide. The precipitate was separated by filtration, washed with a small proportion of methanol and air dried. The product was found to correspond to the empirical formula ($C_6H_{10}O_3$) and had a melting point of 110–115° C.

The above polymeric peroxide was dissolved in diethylene glycol bis (allyl phthalate) and the mixture heated for twelve hours at 110° C. A transparent solid resin was thereby produced.

Example II

A mixture of 57 g. of acetonylacetone peroxide, 150 g. of 28.5 percent aqueous hydrogen peroxide and 10 cc. of concentrated hydrochloric acid was prepared while keeping the temperature below 15° C. by cooling on an ice bath. After stirring for two hours, the mixture was permitted to stand over night. The reaction mass was then retreated with 150 g. of the aqueous hydrogen peroxide in the presence of 10 cc. of concentrated hydrochloric acid. An oily liquid separated from the reaction mass. The aqueous phase reaction mass was then saturated with sodium sulfate to form an additional quantity of the oily liquid. The two non-aqueous liquid fractions were combined and washed with saturated sodium sulfate solution and then dried over anhydrous sodium sulfate. The purified liquid was apparently a mixture of monomeric acetonylacetone peroxide and the polymer thereof. Upon standing over night, crystals appeared which were filtered off and recrystallized from chloroform at a temperature of −70° C. The resulting product was a solid having a melting point of about 122° C. An analysis showed it to contain approximately 21 percent active oxygen. The formula $C_6H_{10}O_4$ corresponds to 21.9 percent active oxygen.

Example III

A mixture of 50 parts by weight of acetonylacetone and 150 parts of 28 percent aqueous hydrogen peroxide and 10 parts of concentrated hydrochloric acid was cooled on an acid bath to a temperature below 15° C. After stirring for six hours the solution was saturated with sodium sulfate. A non-aqueous phase thereby formed was separated and washed with saturated sodium sulfate solution and dried over anhydrous sodium sulfate. An analysis showed that the peroxy compound so formed contained 16.1 percent of active oxygen indicating that 68 percent of the carbonyl groups had become peroxidized.

Example IV

Acetonylacetone (30 g.) was mixed with 1000 cc. of approximately 0.5 molar ethereal hydrogen peroxide and allowed to stand for 24 hours. The resulting solution was concentrated by evacuating with a water pump for 48 hours to produce a viscous solution. The small amount of ether remaining was evaporated by heating gently at a reduced pressure (150–200 mm.). A solid peroxide compound was precipitated by adding 300 cc. of methyl alcohol. An analysis showed that the peroxide contained 11–12 percent active oxygen. It had a melting point of 156° C.

Although the invention has been described with respect to certain specific embodiments it is not intended that the details thereof should be construed as limitations upon the scope of the invention.

What I claim is:

1. A solid polymeric peroxide of acetonylacetone.

2. A solid polymeric peroxide of acetonyl acetone having the general analysis $C_6H_{10}O_x$, where $x$ is a number including fractions not less than 3 nor more than 4.

HYMAN RUDOFF.

REFERENCES CITED

The following references are of record in the file of this patent:

UNITED STATES PATENTS

| Number | Name | Date |
| --- | --- | --- |
| 2,092,322 | Moser | Sept. 7, 1937 |

OTHER REFERENCES

Moser, A. P. C. Serial No. 307,933, published June 15, 1943.